US012395658B2

(12) United States Patent
Chen et al.

(10) Patent No.: US 12,395,658 B2
(45) Date of Patent: *Aug. 19, 2025

(54) METHOD FOR DERIVING CONSTRUCTED AFFINE MERGE CANDIDATES

(71) Applicant: BEIJING DAJIA INTERNET INFORMATION TECHNOLOGY CO., LTD., Beijing (CN)

(72) Inventors: Yi-Wen Chen, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,771

(22) Filed: Jul. 13, 2023

(65) Prior Publication Data

US 2023/0362395 A1  Nov. 9, 2023

Related U.S. Application Data

(63) Continuation of application No. 17/346,021, filed on Jun. 11, 2021, now Pat. No. 11,729,408, which is a
(Continued)

(51) Int. Cl.
*H04N 19/105* (2014.01)
*H04N 19/137* (2014.01)
(Continued)

(52) U.S. Cl.
CPC ........... *H04N 19/44* (2014.11); *H04N 19/105* (2014.11); *H04N 19/137* (2014.11); *H04N 19/176* (2014.11); *H04N 19/46* (2014.11)

(58) Field of Classification Search
CPC .... H04N 19/44; H04N 19/105; H04N 19/137; H04N 19/176; H04N 19/46
(Continued)

(56) References Cited

U.S. PATENT DOCUMENTS

2013/0207327 A1  8/2013  Besliu
2013/0287116 A1  10/2013  Helle et al.
(Continued)

FOREIGN PATENT DOCUMENTS

CN  107314077 A  11/2017
CN  108600749 A  9/2018
(Continued)

OTHER PUBLICATIONS

International Search Report of PCT Application No. PCT/CN2019/066385 dated Apr. 14, 2020, (3p).
(Continued)

*Primary Examiner* — Albert Kir
(74) *Attorney, Agent, or Firm* — Arch & Lake LLP

(57) ABSTRACT

The present disclosure relates to a method for deriving constructed affine merge candidates. The method includes acquiring one or more control point sets from a decoder. The decoder determines whether a reference index of each control point for the control point set index within the control point set associated with a reference index pointing into a reference picture in a first reference picture list is greater than or equal to zero and each is equal to each other. The decoder also determines whether a reference index of each control point for the control point set index within the control point set associated with a reference index pointing into a reference picture in a second reference picture list is greater than or equal to zero and each is equal to each other. The decoder determines that an affine motion model is available based on the determination result.

17 Claims, 14 Drawing Sheets

Related U.S. Application Data continuation of application No. PCT/US2019/066385, filed on Dec. 13, 2019.

(60) Provisional application No. 62/779,423, filed on Dec. 13, 2018.

(51) Int. Cl.
*H04N 19/176* (2014.01)
*H04N 19/44* (2014.01)
*H04N 19/46* (2014.01)

(58) Field of Classification Search
USPC ............................................. 375/240.25
See application file for complete search history.

(56) References Cited

U.S. PATENT DOCUMENTS

| | | | |
|---|---|---|---|
| 2017/0214932 A1 | 7/2017 | Huang | |
| 2018/0270500 A1 | 9/2018 | Li et al. | |
| 2019/0110064 A1* | 4/2019 | Zhang | H04N 19/184 |
| 2019/0208211 A1* | 7/2019 | Zhang | H04N 19/537 |
| 2020/0221120 A1 | 7/2020 | Robert et al. | |
| 2020/0236391 A1* | 7/2020 | Lee | H04N 19/119 |
| 2020/0296415 A1* | 9/2020 | Chen | H04N 19/46 |
| 2020/0374549 A1 | 11/2020 | Li et al. | |
| 2021/0168355 A1* | 6/2021 | Chen | H04N 19/70 |
| 2021/0227207 A1 | 7/2021 | Zhang et al. | |
| 2021/0235100 A1* | 7/2021 | Lee | H04N 19/176 |
| 2021/0235105 A1* | 7/2021 | Chen | H04N 19/513 |
| 2021/0243436 A1 | 8/2021 | Fukushima et al. | |
| 2021/0266591 A1 | 8/2021 | Zhang et al. | |
| 2021/0274208 A1* | 9/2021 | Zhang | H04N 19/139 |
| 2021/0281859 A1* | 9/2021 | Zhang | H04N 19/96 |
| 2021/0385485 A1* | 12/2021 | Liao | H04N 19/105 |
| 2021/0400298 A1 | 12/2021 | Zhao et al. | |
| 2021/0400299 A1 | 12/2021 | Zhu et al. | |
| 2022/0303571 A1* | 9/2022 | Zhang | H04N 19/176 |
| 2023/0037273 A2* | 2/2023 | He | H04N 19/56 |

FOREIGN PATENT DOCUMENTS

| | | |
|---|---|---|
| CN | 108605137 A | 9/2018 |
| WO | 2017118411 A1 | 7/2017 |
| WO | 2017171107 A1 | 10/2017 |
| WO | 2018128380 A1 | 7/2018 |

OTHER PUBLICATIONS

Akula, Sri Nitchith, et al., Description of SDR, HDR and 360 degree Video Coding Technology Proposal Considering Mobile Application Scenario by Samsung, Huawei, GoPro and HiSilicon, Joint Video Exploration Team (JVET) of ITU-TSG 16 WP3 and ISO/IEC JTC 1/SC 29/WG 11, JVET-J0024_v2, 10th Meeting, San Diego, CA, Apr. 20, 2018, (119p).

First Office Action issued for counterpart Korean Patent Application No. 10-2021-7018243 dated Sep. 9, 2021 with the English translation, (8p).

Benjamin Bross, et. al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K1001, (141p).

First Office Action issued for corresponding Japanese Patent Application 2021-534245 mailed on Nov. 24, 2021, with the English translation, (9p).

Benjamin Bross et al., "Versatile Video Coding (Draft 3)", Joint Video Experts Team (JVET), Dec. 10, 2018, [JVET-L1001-v5] (version 9), (9p).

Jaeho Lee et al., "CE4: Simplified affine MVP list construction (Test 4.1.4)", Joint Video Experts Team (JVET), Sep. 24, 2018, [JVET-L0141] (version 1), (8p).

Second Office Action issued for counterpart Chinese patent application No. 202010630265.5, dated Jan. 29, 2022 along with machine EN translation downloaded from EPO (16p).

Second Office Action of Japanese patent Application No. 2021-534245 dated Mar. 22, 2022,with the English translation, (6p).

Third Office Action of Japanese patent Application No. 2021-534245 dated Aug. 23, 2022, with the English translation,(9p).

Extended European Search Report of EP Application No. 19897376.0 dated Sep. 14, 2022, (4p).

First Office Action of EP Application No. 19897376.0 dated Sep. 26, 2022, (8p).

Examination Report of Indian Application No. 202147030412 dated Oct. 20, 2022, with the English translation,(7p).

Chen, Jianle et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v1, 12th Meeting: Macao, China, Oct. 3-12, 2018, (37p).

Bross, Benjamin et al., "Versatile Video Coding (Draft 3)", Joint Video Experts Team (JVET) of ITU-T SG16 WP3 and ISO/IEC JTC 1/SC 29/WG11, JVET-L1001-v1, 12th Meeting Macao, China, Oct. 3-12, 2018, (160p).

Japanese Office Action issued to Japanese Application No. 2023-041350 dated May 21, 2024 with English translation (7p).

Korean Office Action issued to Korean Application No. 10-2022-7007300 dated Aug. 12, 2024 with English translation (8p).

Bross, Benjamin et al., Versatile Video Coding (Draft 3), Joint Video Experts Team (JVET) of ITU-T SG 16 WP 3 and ISO/IEC JTC 1/SC 29/WG 11, JVET-L1001-v5, 12th Meeting: Macao, China, Oct. 3-12, 2018, (10p).

Bross, Benjamin et al., Versatile Video Coding (Draft 2), Joint Video Experts Team (JVET) of ITU-T SG 16 WP 3 and ISO/IEC JTC 1/SC 29/WG 11, JVET-K1001-v6, 11th Meeting: Ljubljana, SI, Jul. 10-18, 2018, (141p).

JPOA issued in Application No. 2023-041350 dated Oct. 8, 2024 with English translation, (4p).

Jianle Chen et al, Algorithm description for Versatile Video Coding and Test Model 3 (VTM 3), JVET-L1002-v1 Joint Video Experts Team (JVET) of ITU-T SG 16 WP 3 and ISO/IEC JTC 1/SC 29/WG 11 12th Meeting: Macao, CN, Oct. 3-12, 2018, (38p).

The First Office Action and search report issued on Jan. 21, 2025 for counterpart Chinese patent application No. 202111573130.0, along with machine EN translation downloaded from EPO. (19p).

\* cited by examiner

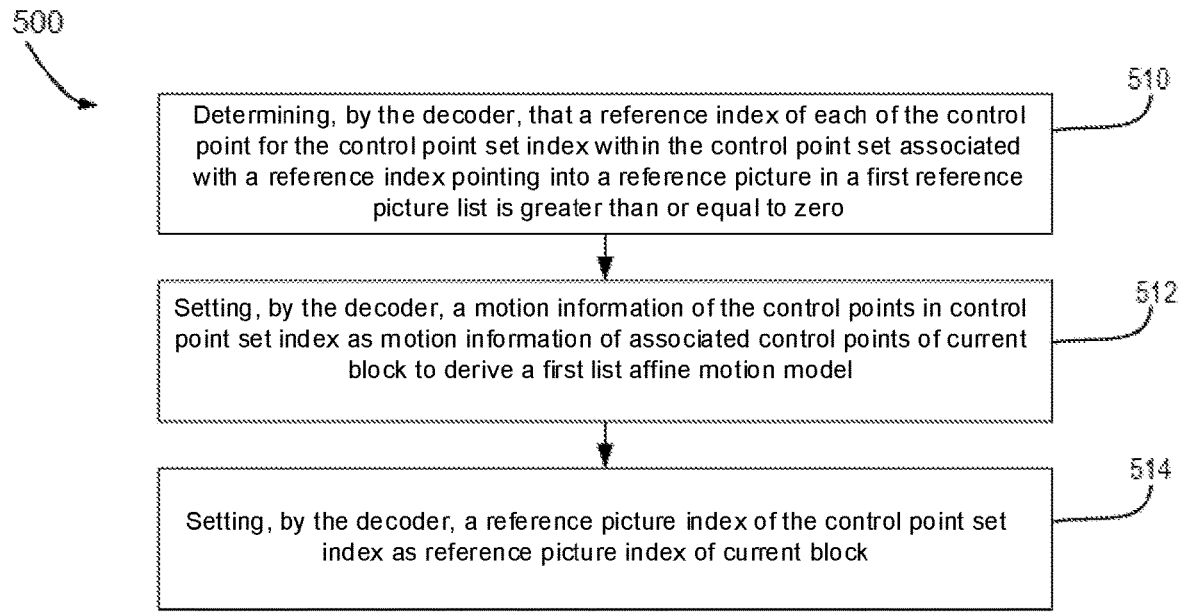
Fig. 5
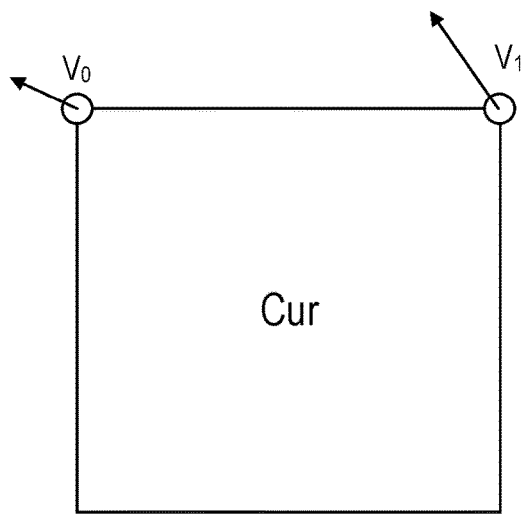
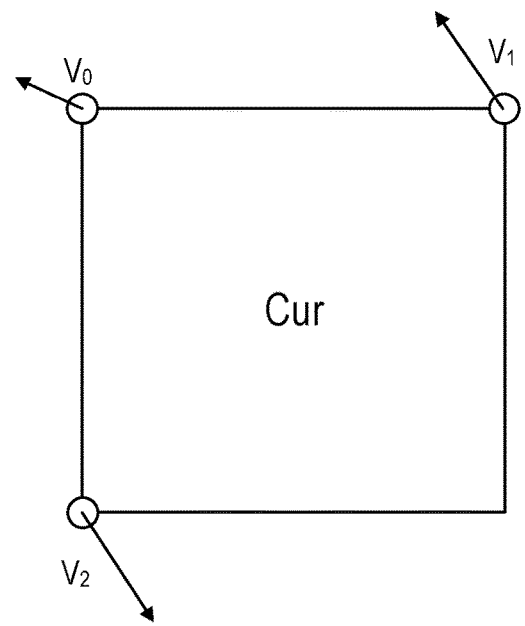
FIG. 6A FIG. 6B

```
If (L0 RefIdx of CPSets[CPSetIdx][0]>=0 &&L0 RefIdx of
CPSets[CPSetIdx][1]>=0 && L0 RefIdx of CPSets[CPSetIdx][2]>=0
&& L0 RefIdx of CPSets[CPSetIdx][0]== L0 RefIdx of CPSets[CPSetIdx][1]
&& L0 RefIdx of CPSets[CPSetIdx][0]== L0 RefIdx of CPSets[CPSetIdx][2]
&& (L0 MV of CPSets[CPSetIdx][0]!= L0 MV of CPSets[CPSetIdx][1]
||   L0 MV of CPSets[CPSetIdx][0]!= L0 MV of CPSets[CPSetIdx][2] )
)
{
    availableL0=true;
  Use the motion information of the control points in CPSets[CPSetIdx] as
the motion information of the associated control points of current block
to derive the L0 affine motion model
}
else if (L0 RefIdx of CPSets[CPSetIdx][0]>=0
{
    availableL0=true;
  Use the motion information of the control points CPSets[CPSetIdx][0] as
the motion information of all the control points of current block to
derive the L0 affine motion model
}
else if (L0 RefIdx of CPSets[CPSetIdx][1]>=0
{
    availableL0=true;
  Use the motion information of the control point CPSets[CPSetIdx][1] as
the motion information of all the control points of current block to
 derive the L0 affine motion model
}
else if (L0 RefIdx of CPSets[CPSetIdx][2]>=0
{
    availableL0=true;
  Use the motion information of the control points CPSets[CPSetIdx][2] as
the motion information of all the control points of current block to
derive the L0 affine motion model
}
else
{
    availableL0=false;
}
```

FIG. 14

```
If (L0 RefIdx of CPSets[CPSetIdx][0]>=0 &&L0 RefIdx of
CPSets[CPSetIdx][1]>=0 && L0 RefIdx of CPSets[CPSetIdx][2]>=0
&& L0 RefIdx of CPSets[CPSetIdx][0]== L0 RefIdx of CPSets[CPSetIdx][1]
&& L0 RefIdx of CPSets[CPSetIdx][0]== L0 RefIdx of CPSets[CPSetIdx][2]
)
{
    availableL0=true;
  Use the motion information of the control points in CPSets[CPSetIdx] as
the motion information of the associated control points of current block
to derive the L0 affine motion model
}
else if (L0 RefIdx of CPSets[CPSetIdx][0]>=0
{
    availableL0=true;
  Use the motion information of the control points CPSets[CPSetIdx][0] as
the motion information of all the control points of current block to
derive the L0 affine motion model
}
else if (L0 RefIdx of CPSets[CPSetIdx][1]>=0
{
    availableL0=true;
  Use the motion information of the control point CPSets[CPSetIdx][1] as
the motion information of all the control points of current block to
derive the L0 affine motion model
}
else if (L0 RefIdx of CPSets[CPSetIdx][2]>=0
{
    availableL0=true;
  Use the motion information of the control point CPSets[CPSetIdx][2] as
the motion information of all the control points of current block to
derive the L0 affine motion model
}
else
{
    availableL0=false;
}
```

FIG. 15

```
If (L0 RefIdx of CPSets[CPSetIdx][0]>=0 &&L0 RefIdx of
CPSets[CPSetIdx][1]>=0 && L0 RefIdx of CPSets[CPSetIdx][2]>=0
)
{
   availableL0=true;
 Use the motion information of the control points in CPSets[CPSetIdx] as
the motion information of the associated control points of current block
to derive the L0 affine motion model. The reference picture index of
CPSets[CPSetIdx][0] is set as the reference picture index of current
block.
}
```

FIG. 16

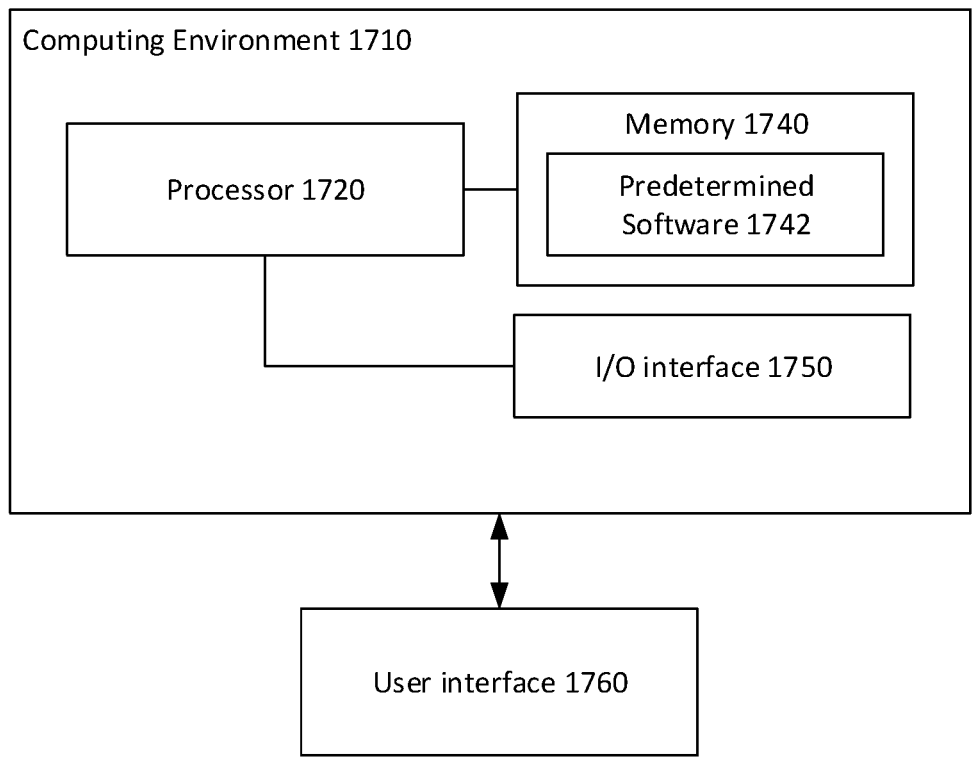

FIG. 17

METHOD FOR DERIVING CONSTRUCTED AFFINE MERGE CANDIDATES

CROSS-REFERENCE TO RELATED APPLICATION

This application is a continuation of U.S. application Ser. No. 17/346,021 filed on Jun. 11, 2021, which is a continuation of PCT Application PCT/US2019/066385 filed on Dec. 13, 2019, which is based upon and claims priority to Provisional Application No. 62/779,423 filed Dec. 13, 2018, the disclosures of which are incorporated herein by reference in their entities for all purposes.

TECHNICAL FIELD

This application is related to video coding and compression. More specifically, this application relates to systems and methods for affine motion prediction in video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate while avoiding or minimizing degradations to video quality.

SUMMARY

Examples of the present disclosure provide a method for deriving constructed affine merge candidates.

According to a first aspect of the present disclosure, a video decoding method is provided, the method comprises: acquiring one or more control point sets by a decoder, wherein each control point set includes a control point set index and multiple control points; wherein each control point includes first reference index, first motion vector, second reference index, and second motion vector; determining, by the decoder, whether a reference index of each control point for the control point set index within the control point set associated with a reference index in a first reference list is greater than or equal to zero and each is equal to each other; determining, by the decoder, whether a reference index of each control point for the control point set index within the control point set associated with a reference index in a second reference list is greater than or equal to zero and each is equal to each other; and setting, by the decoder, a flag indicating that an affine motion model is available based on the determination result.

According to a second aspect of the present disclosure, a video decoding device is provided, the device comprises: one or more processors; a non-transitory computer-readable memory storing instructions executable by the one or more processors, wherein the one or more processors are configured to: acquire one or more control point sets by a decoder, wherein each control point set includes a control point set index and multiple control points; wherein each control point includes first reference index, first motion vector, second reference index, and second motion vector; determine, by the decoder, whether a reference index of each control point for the control point set index within the control point set associated with a reference index in a first reference list is greater than or equal to zero and each is equal to each other; determine, by the decoder, whether a reference index of each control point for the control point set index within the control point set associated with a reference index in a second reference list is greater than or equal to zero and each is equal to each other; and set, by the decoder, a flag indicating that an affine motion model is available based on the determination result.

According to a third aspect of the present disclosure, a non-transitory computer-readable storage medium storing a plurality of programs for execution by a video decoding device having one or more processors is provided, wherein the plurality of programs, when executed by the one or more processors, cause the video decoding device to perform decoding operations including: acquiring one or more control point sets by a decoder, wherein each control point set includes a control point set index and multiple control points; wherein each control point includes first reference index, first motion vector, second reference index, and second motion vector; determining, by the decoder, whether a reference index of each control point for the control point set index within the control point set associated with a reference index in a first reference list is greater than or equal to zero and each is equal to each other; determining, by the decoder, whether a reference index of each control point for the control point set index within the control point set associated with a reference index in a second reference list is greater than or equal to zero and each is equal to each other; and setting, by the decoder, a flag indicating that an affine motion model is available based on the determination result.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5 is a flow chart illustrating a method for deriving constructed affine merge candidates, according to an example of the present disclosure.

FIG. 6A is a control point based affine motion model, according to an example of the present disclosure.

FIG. 6B is a control point based affine motion model, according to an example of the present disclosure.

FIG. 14 is a derivation of an affine motion model, according to an example of the present disclosure.

FIG. 15 is a derivation of an affine motion model, according to an example of the present disclosure.

FIG. 16 is a derivation of an affine motion model, according to an example of the present disclosure.

FIG. 17 a block diagram of a computing environment, according to an example of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Conceptually, video coding standards are similar. For example, many uses block-based processing and share similar video coding block diagram to achieve video compression.

Figure 1:
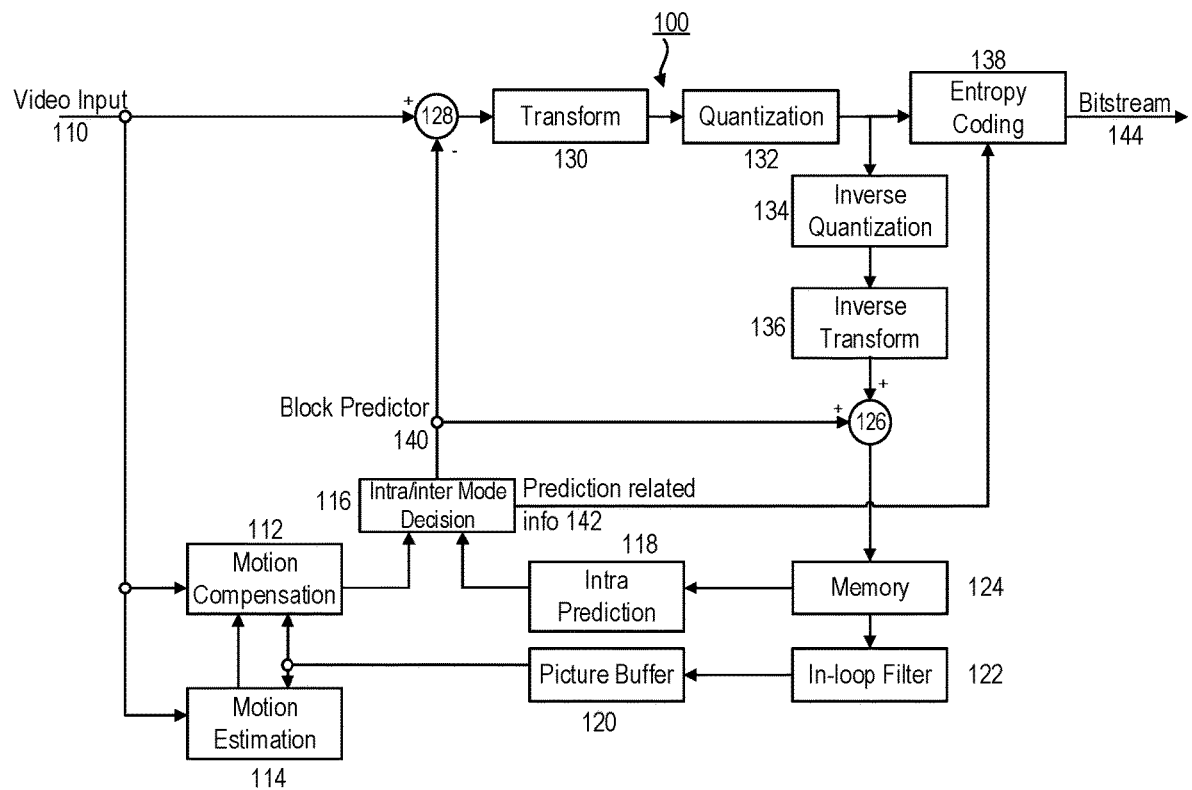
FIG. 1 is a block diagram of an encoder, according to an example of the present disclosure.

FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In an example embodiment of the encoder, a video frame is partitioned into blocks for processing. For each given video block, a prediction is formed based on either inter prediction or intra prediction. In inter prediction, predictors may be formed through motion estimation and motion compensation, based on pixels from previously reconstructed frames. In intra prediction, predictors may be formed based on reconstructed pixels in the current frame. Through mode decision, the best predictor may be chosen to predict a current block.

The prediction residual (i.e., the difference between a current block and its predictor) is sent to the transform module. Transform coefficients are then sent to the quantization module for entropy reduction. Quantized coefficients are fed to the entropy coding module to generate compressed video bitstream. As shown in FIG. 1, prediction related info from inter and/or intra prediction modules, such as block partition info, motion vectors, reference picture index, and intra prediction mode, etc., are also going through entropy coding module and saved into a bitstream.

In the encoder, decoder related modules are also needed in order to reconstruct pixels for prediction purposes. First, the prediction residual is reconstructed through inverse quantization and inverse transform. Such a reconstructed prediction residual is combined with the block predictor to generate un-filtered reconstructed pixels for a current block.

To improve coding efficiency and visual quality, the in-loop filter is commonly used. For example, deblocking filter is available in AVC, HEVC as well as the current VVC. In HEVC, an additional in-loop filter called SAO (sample adaptive offset) is defined to further improve coding efficiency. In the latest VVC, yet another in-loop filter called ALF (adaptive loop filter) is being actively investigated, and it has a high chance of being included in the final standard.

These in-loop filter operations are optional. Usually, turning them on helps improve coding efficiency and visual quality. They may also be turned-off as an encoder decision to save computation complexity.

It should be noted that intra prediction is usually based on unfiltered reconstructed pixels, while inter prediction is based on filtered reconstructed pixels if these filter options are turned on by encoder.

Figure 2:
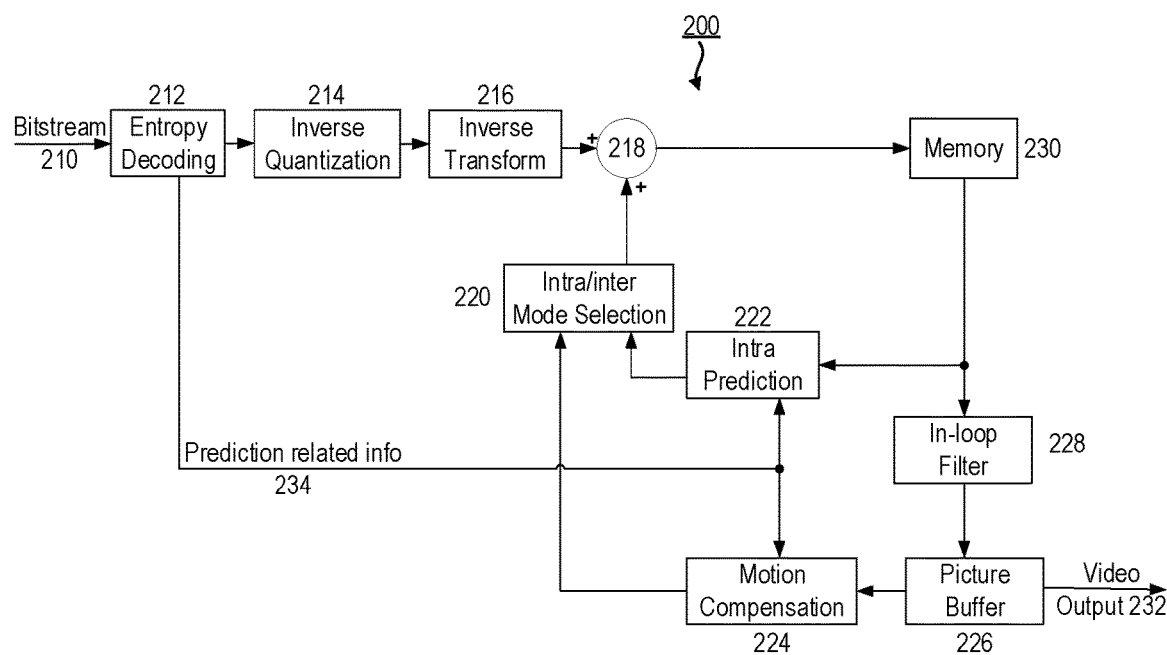
FIG. 2 is a block diagram of a decoder, according to an example of the present disclosure.

FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

In the decoder, the bitstream is first decoded through the entropy decoding module to derive quantized coefficient levels and prediction related info. Quantized coefficient levels are then processed through inverse quantization and inverse transform modules to obtain reconstructed prediction residual. A block predictor is formed through either intra prediction or motion compensation process based on prediction info decoded. The unfiltered reconstructed pixels are obtained by summing up the reconstructed prediction residual and the block predictor. In case the in-loop filter is turned on, filtering operations are performed on these pixels to derive the final reconstructed video for output.

Figure 3:
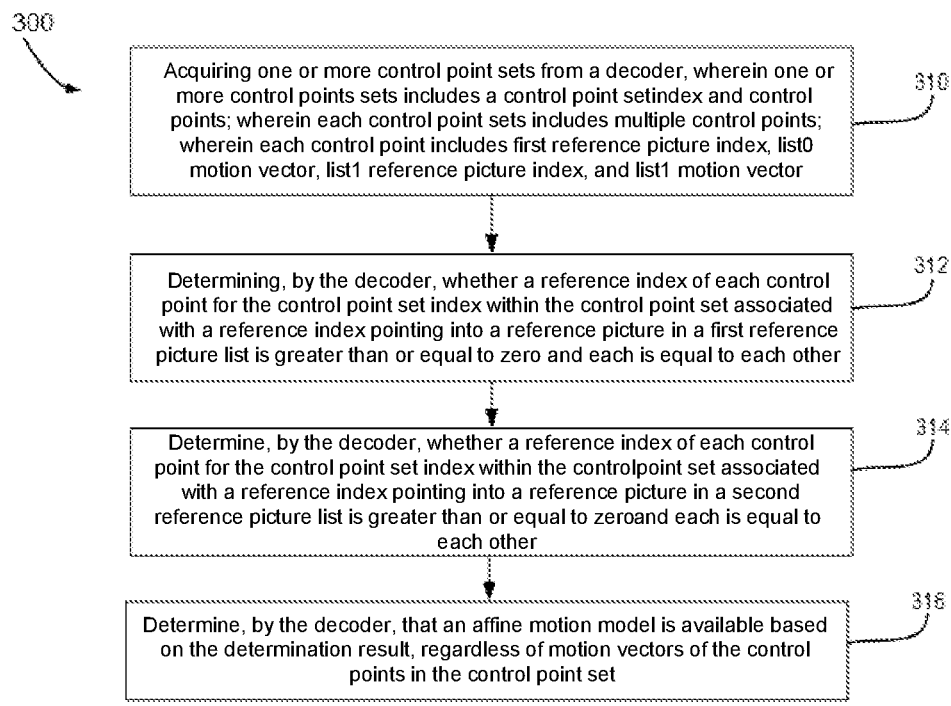
FIG. 3 is a flow chart illustrating a method for deriving constructed affine merge candidates, according to an example of the present disclosure.

FIG. 3 shows an example flow chart setting forth the steps of a method 300 in accordance with the present disclosure.

The constructed affine merges derivation, including checking whether the associated control points sets are valid are performed at both encoder and decoder sides.

In step 310, acquiring one or more control point sets from a decoder, wherein one or more control points sets includes a control point set index and control points; wherein each control point sets includes multiple control points; wherein each control point includes first reference picture index, list0 motion vector, list1 reference picture index, and list1 motion vector.

In an example embodiment, acquiring the control point set from the decoder comprises acquiring spatial neighboring blocks and temporal blocks from a video input, determining control points based on the spatial neighboring blocks and temporal blocks, deriving motion information based on the control points from the spatial neighboring blocks and the temporal blocks, and defining control point sets based on the control points, wherein a control point set includes the control point set index.

Each control point has two reference indices. One control point refers to the reference picture in the reference picture list 0, and the other one points to the reference picture in the reference picture list 1. And two flags are used in VVC spec to indicate whether list0/list1 prediction is used. For example, flag one flag X one is used to indicate whether list X is used or not. (where X can be 0 or 1)

For a control point utilizing only list0 prediction (we usually call it a uni-prediction), its list0 reference index should point to one reference picture, and thus the index value should be larger or equal to 0. And its list1 reference index does not point to any reference picture, and its value is set to a value representing in-valid (e.g., −1 in VVC spec). Moreover, flag one N is set to 1/true and flag two N is set to 0/false in this case.

For a control point utilizing only list1 prediction (we usually call it a uni-prediction), its list1 reference index should point to one reference picture, and thus the index value should be larger or equal to 0. And its list0 reference index does not point to any reference picture, and its value is set to a value representing in-valid (e.g., −1 in VVC spec). Moreover, flag one N is set to 0/false and flag two N is set to 1/true in this case.

For a control point utilizing both list 0 and list1 prediction, both its list 0 reference index and list1 reference index are larger than or equal to 0. Moreover, flag one N is set to 1/true and flag two N is set to 1/true in this case.

In step 312, determining, by the decoder, whether a reference index of each control point for the control point set index within the control point set associated with a reference index pointing into a reference picture in a first reference picture list is greater than or equal to zero and each is equal to each other.

In step 314, determine, by the decoder, whether a reference index of each control point for the control point set index within the control point set associated with a reference index pointing into a reference picture in a second reference picture list is greater than or equal to zero and each is equal to each other.

In step 316, determine, by the decoder, that an affine motion model is available based on the determination result, regardless of motion vectors of the control points in the control point set.

Figure 4:
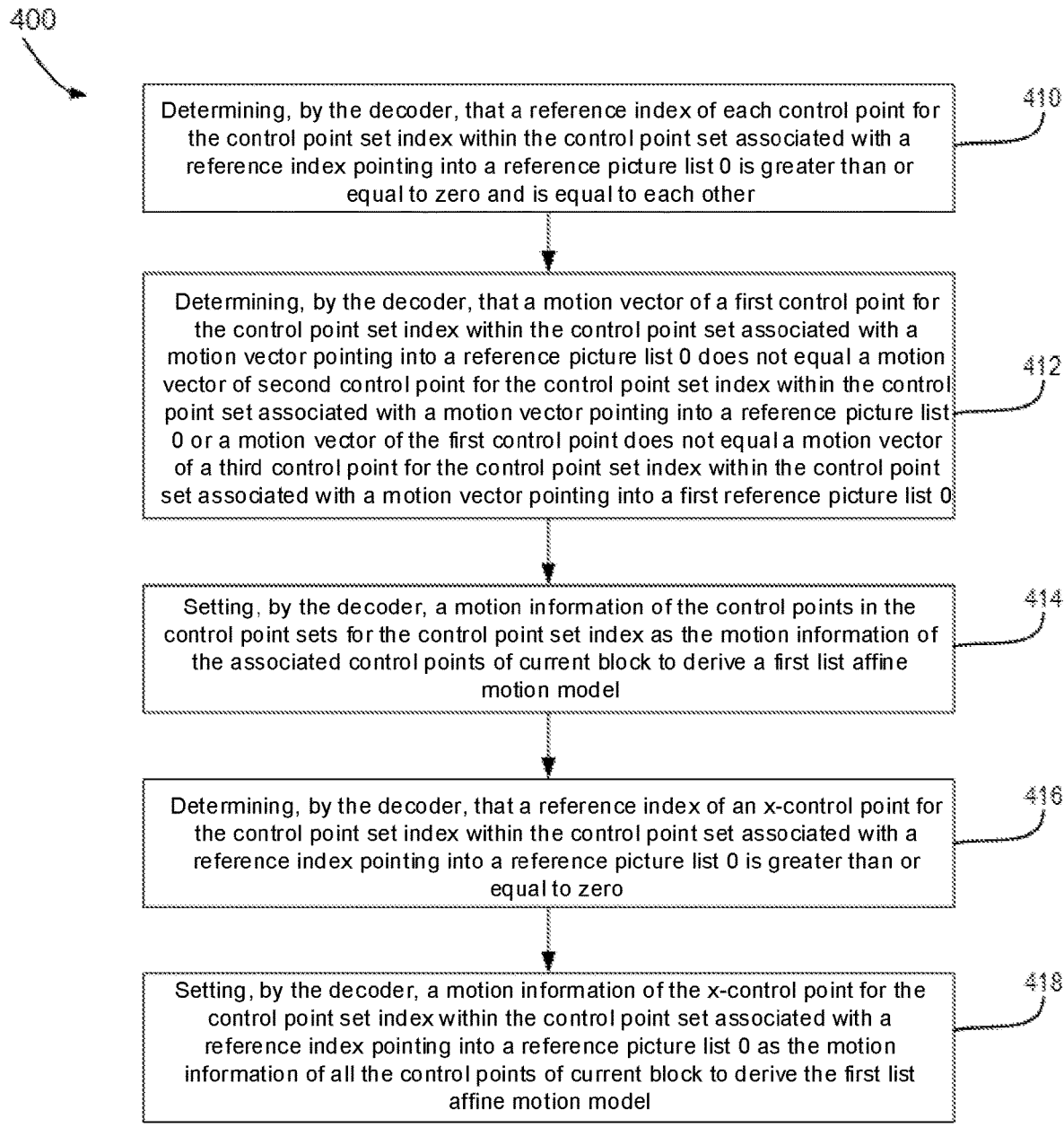
FIG. 4 is a flow chart illustrating a method for deriving constructed affine merge candidates, according to an example of the present disclosure.

FIG. 4 shows an example flow chart setting forth the steps of a method 400 in accordance with the present disclosure.

In step 410, determining, by the decoder, that a reference index of each control point for the control point set index within the control point set associated with a reference index pointing into a reference picture list 0 is greater than or equal to zero and is equal to each other.

In step 412, determining, by the decoder, that a motion vector of a first control point for the control point set index within the control point set associated with a motion vector pointing into a reference picture list 0 does not equal a motion vector of second control point for the control point set index within the control point set associated with a motion vector pointing into a reference picture list 0 or a motion vector of the first control point does not equal a motion vector of a third control point for the control point set index within the control point set associated with a motion vector pointing into a first reference picture list 0.

In step 414, setting, by the decoder, a motion information of the control points in the control point sets for the control point set index as the motion information of the associated control points of current block to derive a first list affine motion model.

In step 416, determining, by the decoder, that a reference index of an x-control point for the control point set index within the control point set associated with a reference index pointing into a reference picture list 0 is greater than or equal to zero.

In step 418, setting, by the decoder, a motion information of the x-control point for the control point set index within the control point set associated with a reference index pointing into a reference picture list 0 as the motion information of all the control points of current block to derive the first list affine motion model.

FIG. 5 shows an example flow chart setting forth the steps of a method 500 in accordance with the present disclosure.

In step 510, determining, by the decoder, that a reference index of each of the control for the control point set index within the control point set associated with a reference index pointing into a reference picture in a first reference picture list is greater than or equal to zero.

In step 512, setting, by the decoder, a motion information of the control points in control point set index as motion information of associated control points of current block to derive a first list affine motion model.

In step 514, setting, by the decoder, a reference picture index of the control point set index as reference picture index of current block.

In HEVC, only the translation motion model is applied for motion compensation prediction (MCP). While in the real world, there are many kinds of motion, e.g., zoom in/out, rotation, perspective motions, and the other irregular motions. In the current reference software of VVC (VTM3), a block-based affine transform motion compensation prediction is applied. As shown in FIGS. 6A and 6B (described below), the affine motion field of the block is described by motion information of two control points (4-parameter) or three control point motion vectors (6-parameter).

FIG. 6A shows a control point based affine motion model for a 4-parameter affine model.

FIG. 6B shows a control point based affine motion model for a 6-parameter affine model.

For the 4-parameter affine motion model, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases}$$

For the 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

Where ($mv_{0x}$, $mv_{0y}$) is the motion vector of the top-left corner control point ($mv_{1x}$, $mv_{1y}$) is the motion vector of the top-right corner control point, and ($mv_{2x}$, $mv_{2y}$) is motion vector of the bottom-left corner control point.

Figure 7:
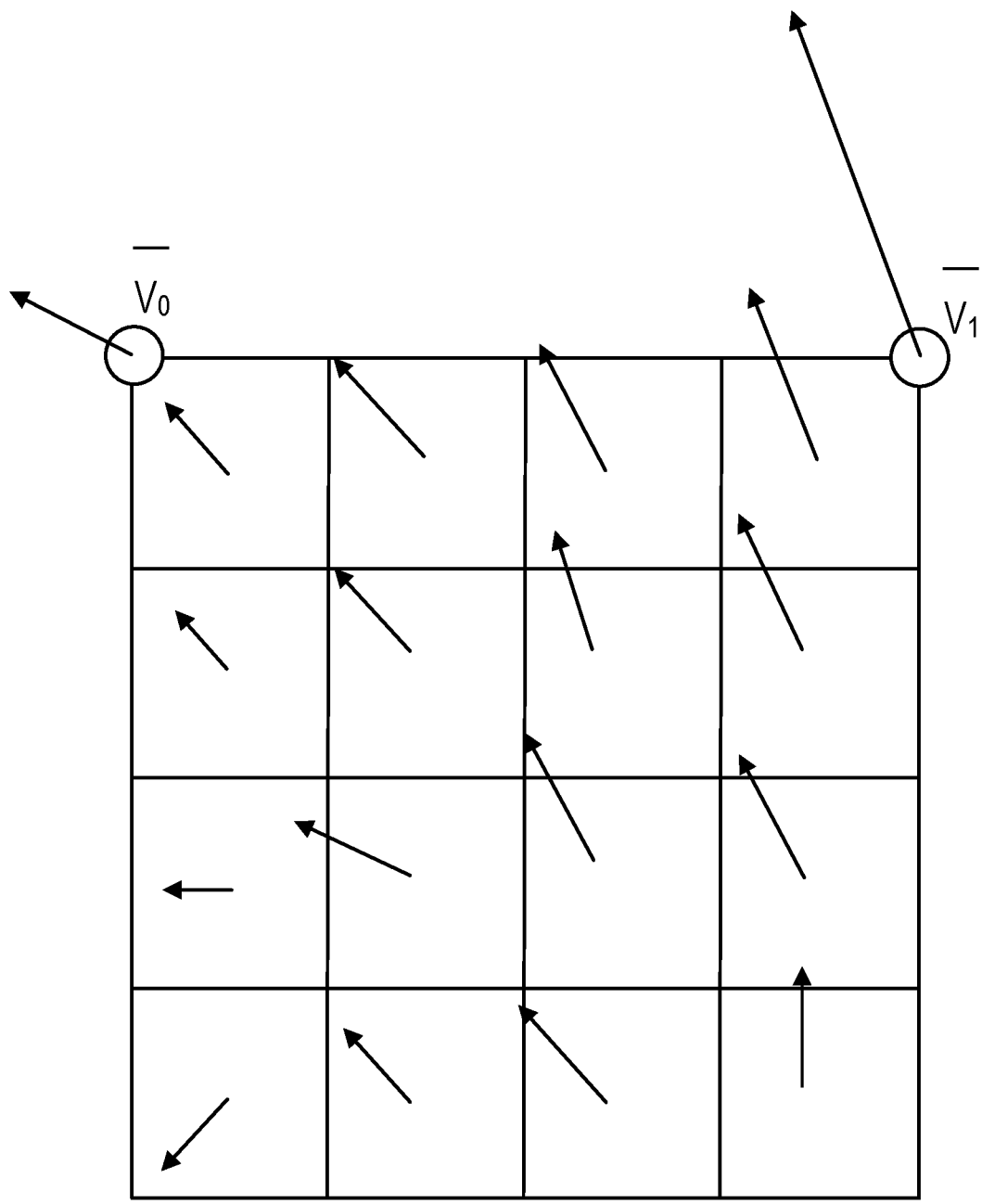
FIG. 7 is an affine motion vector field (MVF) per sub-block, according to an example of the present disclosure.

In order to simplify the motion compensation prediction, block-based affine transform prediction is applied. To derive the motion vector of each 4×4 luma sub-block, the motion vector of the center sample of each sub-block, as shown in FIG. 7 (described below), is calculated according to the above equations, and rounded to 1/16 fraction accuracy. Then the motion compensation interpolation filters are applied to generate the prediction of each sub-block with the derived motion vector. The sub-block size of chroma-components is also set to be 4×4. The motion vector (MV) of a 4×4 chroma sub-block is calculated as the average of the MVs of the four corresponding 4×4 luma sub-blocks.

FIG. 7 shows an affine motion vector field (MVF) per sub-block.

As done for translational motion inter prediction, there is also two affine motion inter prediction modes: affine merge mode and affine AMVP mode.

Affine Merge Prediction

Figure 8:
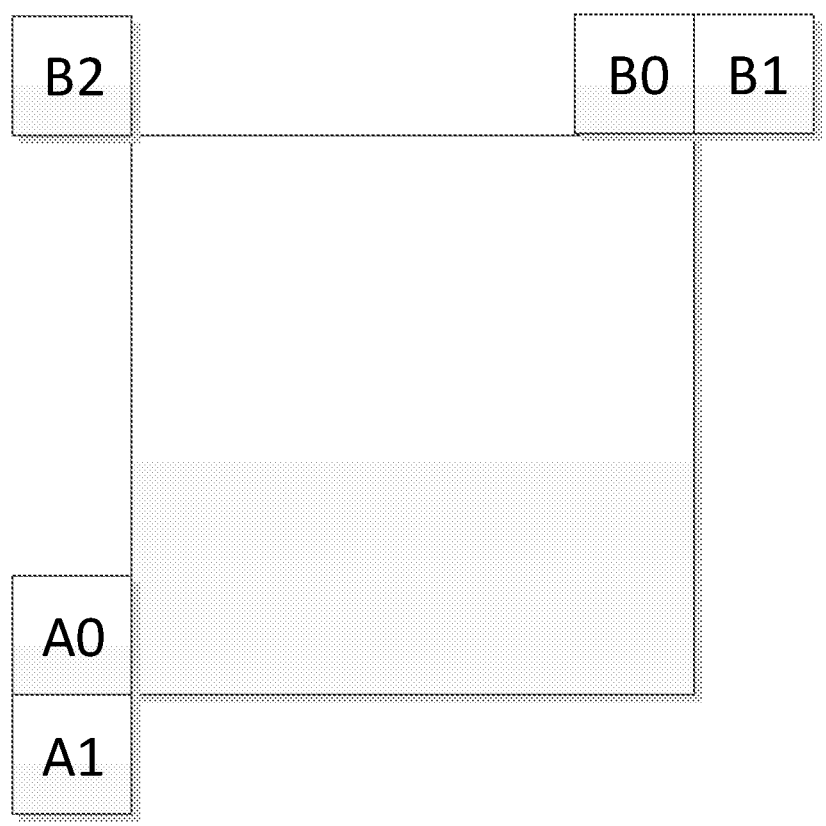
FIG. 8 is the location of candidates' positions, according to an example of the present disclosure.
Figure 9:
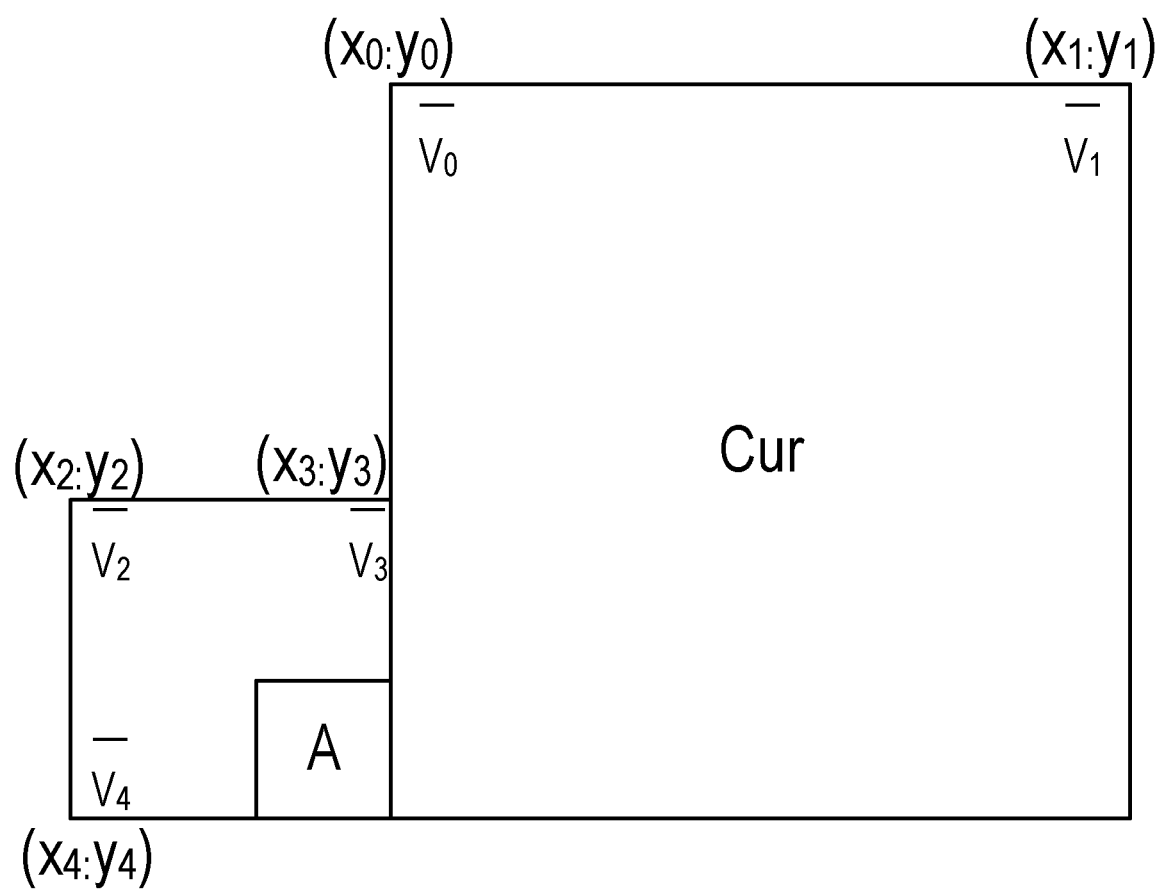
FIG. 9 is a control point motion vector, according to an example of the present disclosure.

AF_MERGE mode can be applied for CUs with both width and height larger than or equal to 8. In this mode, the motion vectors of control points (CPMVs) of the current CU are generated based on the motion information of the spatial neighboring CUs. There can be up to five CPMVP candidates, and an index is signaled to indicate the one to be used for the current CU. The following three types of CPMV candidate are used to form the affine merge candidate list:
 1. Inherited affine merge candidates that extrapolated from the CPMVs of the neighbor CUs
 2. Constructed affine merge candidates CPMVPs that are derived using the translational MVs of the neighbor CUs
 3. Zero MVs In VTM3, there are a maximum of two inherited affine candidates, which are derived from the affine motion model of the neighboring blocks, one from left neighboring CUs and one from above neighboring CUs. The candidate blocks are shown in FIG. 8 (described below). For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derive the CPMVP candidate in the affine merge list of the current CU. As shown in FIG. 9 (described below), if the neighbor left bottom block A is coded in affine mode, the motion vectors $v_2$, $v_3$ and $v_4$ of the top left corner, above right corner and left bottom corner of the CU which contains the block A are attained. When block A is coded with a 4-parameter affine model, the two CPMVs of the current CU are calculated according to $v_2$, and $v_3$. In case that block A is coded with a 6-parameter affine model, the three CPMVs of the current CU are calculated according to $v_2$, $v_3$ and $v_4$.

FIG. 8 shows the location of inherited affine motion predictors.

FIG. 9 shows a control point motion vector inheritance.

Constructed affine candidate means the candidate is constructed by combining the neighbor translational motion information of each control point. The motion information for the control points is derived from the specified spatial neighbors and temporal neighbor shown in FIG. 10 (described below). $CP_k$ (k=1, 2, 3, 4) represents the k-th control point. $CP_1$ is the control point at the top-left corner of the current block, and the B2→B3→A2 blocks are checked, and the MV of the first available block is used as the motion information of $CP_1$. $CP_2$ is the control point at the top-right corner of the current block, and the B1→B0 blocks are checked, and the MV of the first available block is used as the motion information of $CP_1$. $CP_3$ is the control point at the bottom-left corner of the current block, and the A1→A0 blocks are checked. And temporal motion vector predictor (TMVP) is used as to bottom-right control point $CP_4$ if it's available.

Figure 10:
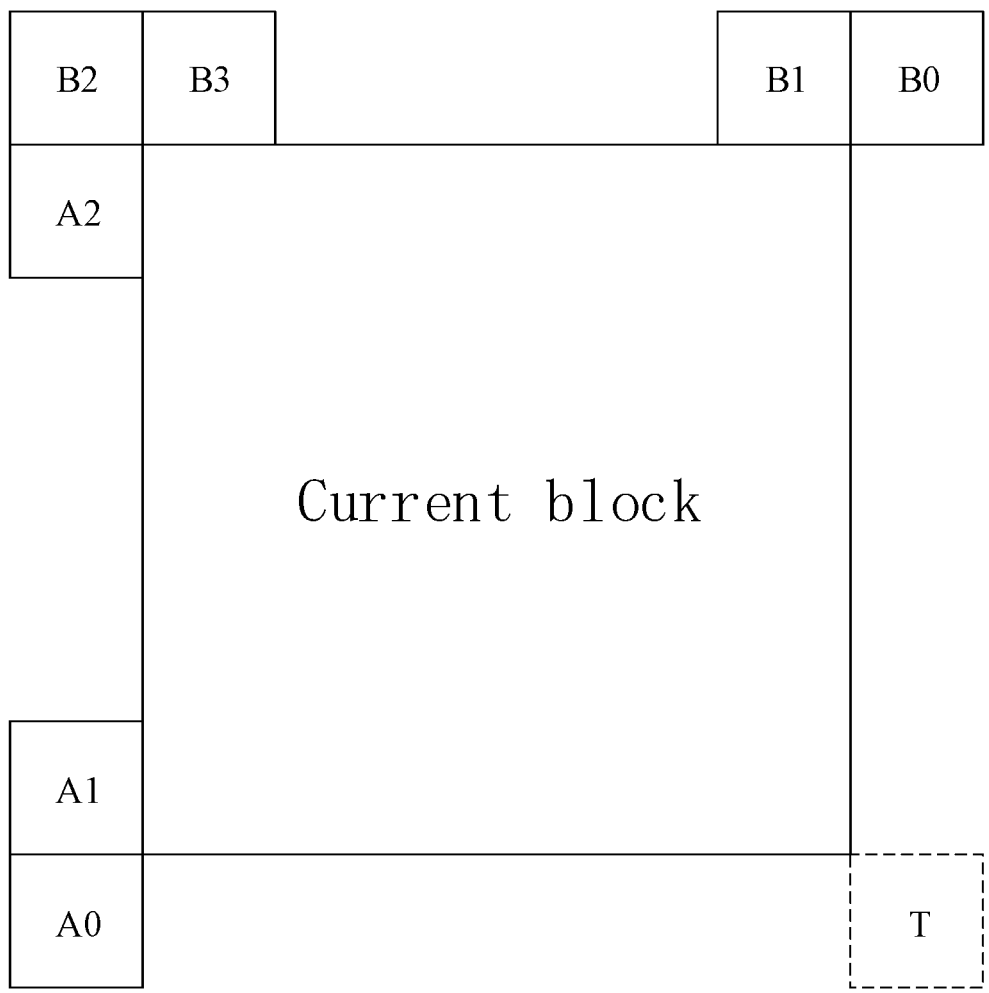
FIG. 10 is the location of candidates' positions, according to an example of the present disclosure.

FIG. 10 shows the locations of candidates' position for constructed affine merge mode.

After the four control points are attained, affine merge candidates are constructed based on the motion information of the control points. The following six combinations of control points are used to construct the constructed affine merge candidates in order:

$\{CP_1, CP_2, CP_3\}$, $\{CP_1, CP_2, CP_4\}$, $\{CP_1, CP_3, CP_4\}$,
$\{CP_2, CP_3, CP_4\}$, $\{CP_1, CP_2\}$, $\{CP_1, CP_3\}$

The combination of 3 control points constructs a 6-parameter affine merge candidate, and the combination of 2 control points constructs a 4-parameter affine merge candidate. To avoid the motion scaling process, if the reference indices of control points are different, the related combination of control point MVs is discarded. Furthermore, when the 2 CPMVs are identical under the 4-parameters affine model (3 CPMVs are identical under the 6-parameters affine model), the associated combination of control point MV is also discarded. The flowchart to derive the constructed affine merge candidate is depicted in FIG. 11 (described below).

Figure 11:
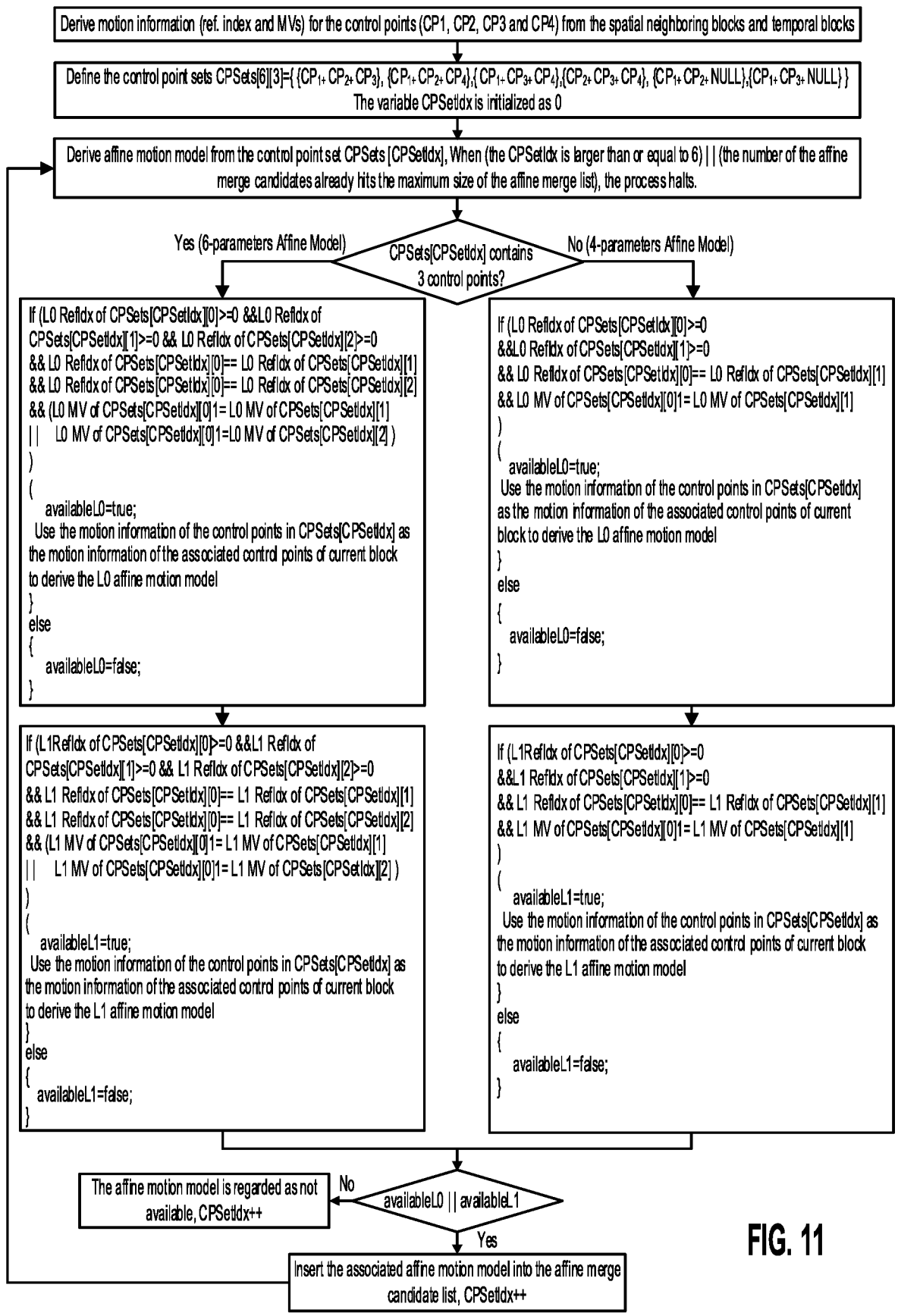
FIG. 11 is a flow chart of derivation constructed affine merge candidates, according to an example of the present disclosure.

FIG. 11 shows a flow chart of derivation constructed affine merge candidates.

Affine AMVP Prediction

Affine AMVP mode can be applied for CUs with both width and height larger than or equal to 16. An affine flag in the CU level is signaled in the bitstream to indicate whether affine AMVP mode is used, and then another flag is signaled to indicate whether 4-parameter affine or 6-parameter affine. In this mode, the difference of the CPMVs of current CU and their predictors CPMVPs is signaled in the bitstream. The affine AMVP candidate list size is two, and it is generated by using the following four types of CPMV candidate in order:
 1. Inherited affine AMVP candidates that extrapolated from the CPMVs of the neighbor CUs
 2. Constructed affine AMVP candidates CPMVPs that are derived using the translational MVs of the neighbor CUs
 3. Translational MVs from neighboring CUs
 4. Zero MVs The checking order of inherited affine AMVP candidates is the same as the checking order of inherited affine merge candidates. The only difference is that, for AMVP candidate, only the affine CU that has the same reference picture as the current block is considered. No pruning process is applied when inserting an inherited affine motion predictor into the candidate list.

Constructed AMVP candidate is only derived from the specified spatial neighbors shown in FIG. 10. The same checking order is used as done in affine merge candidate construction. In addition, the reference picture index of the neighboring block is also checked. The first block in the checking order that is inter-coded and has the same reference picture as in current CUs is used.

If all three CPMVs are attached, it will be inserted into the affine AMVP list as it is. If only $mv_0$ and $mv_1$ are available, $mv_2$ is derived as follows:

$$mv_{2x} = mv_{0x} - h\frac{(mv_{1y} - mv_{0y})}{w}, mv_{2y} = mv_{0y} + h\frac{(mv_{1x} - mv_{0x})}{w}$$

where the current CU size is w×h. If only $mv_0$ and $mv_2$ are available, $mv_1$ is derived as follows:

$$mv_{1x} = mv_{0x} + h\frac{(mv_{2y} - mv_{0y})}{w}, mv_{1y} = mv_{0y} - h\frac{(mv_{2x} - mv_{0x})}{w}$$

If affine AMVP list candidates is still less than 2, $mv_0$, $mv_1$ and $mv_2$ will be added, in order, the translational MVs to predict all control point MVs of the current CU, when available.

Affine Motion Information Storage

In VTM3, the CPMVs of affine CUs are stored in a separate buffer. The stored CPMVs are only used to generate the inherited CPMVPs in affine merge mode and affine AMVP mode for the lately coded CUs. The sub-block MVs derived from CPMVs are used for motion compensation, MV derivation of merge/AMVP list of translational MVs, and deblocking.

Figure 12:
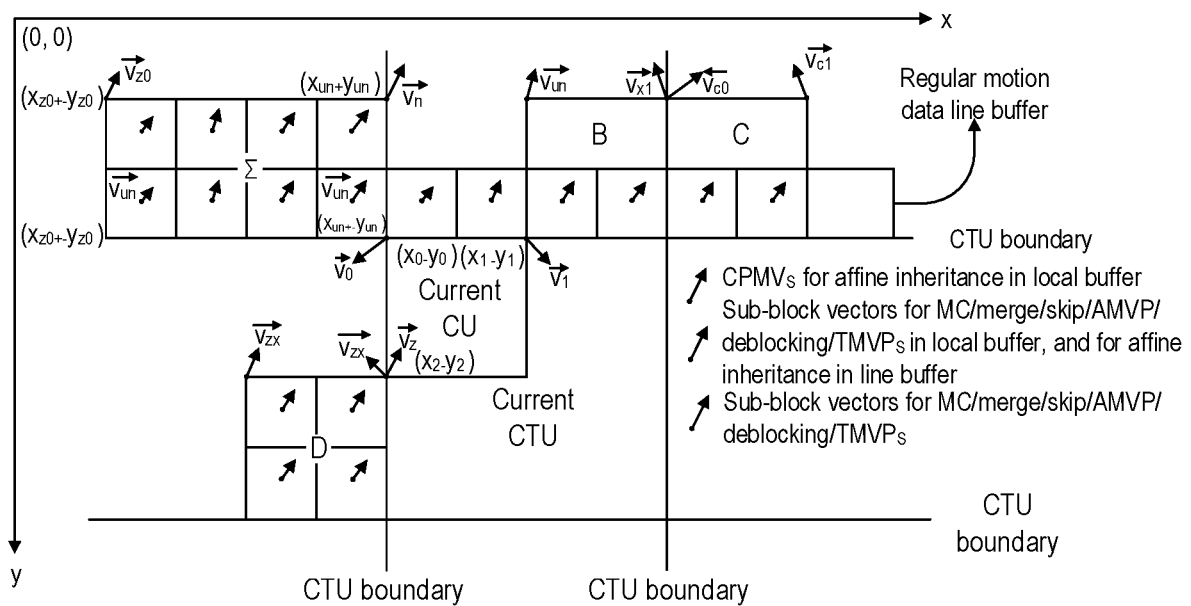
FIG. 12 is an illustration of motion vector usage, according to an example of the present disclosure.

To avoid the picture line buffer for the additional CPMVs, affine motion data inheritance from the CUs from above CTU is treated differently to the inheritance from the normal neighboring CUs. If the candidate CU for affine motion data inheritance is in the above CTU line, the bottom-left and bottom-right sub-block MVs in the line buffer instead of the CPMVs are used for the affine MVP derivation. In this way, the CPMVs are only stored in a local buffer. If the candidate CU is 6-parameter affine coded, the affine model is degraded to the 4-parameter model. As shown in FIG. 12 (described below), along the top CTU boundary, the bottom-left and bottom-right sub-block motion vectors of a CU are used for the affine inheritance of the CUs in bottom CTUs.

FIG. 12 shows an illustration of motion vector usage for the proposed combined method.

In an embodiment when deriving the constructed affine merge candidates, the translation motion model is regarded as valid affine merge candidates since the MVs between control points could be identical. To allow the translational motion model for constructed affine merge candidates, it is proposed to remove the comparison between the MVs of the control points. Since the comparisons between MVs are removed, the proposed scheme could simplify the derivation of the constructed affine merge candidates. An example flowchart based on the existing method is depicted in FIG. 13 (described below).

Figure 13:
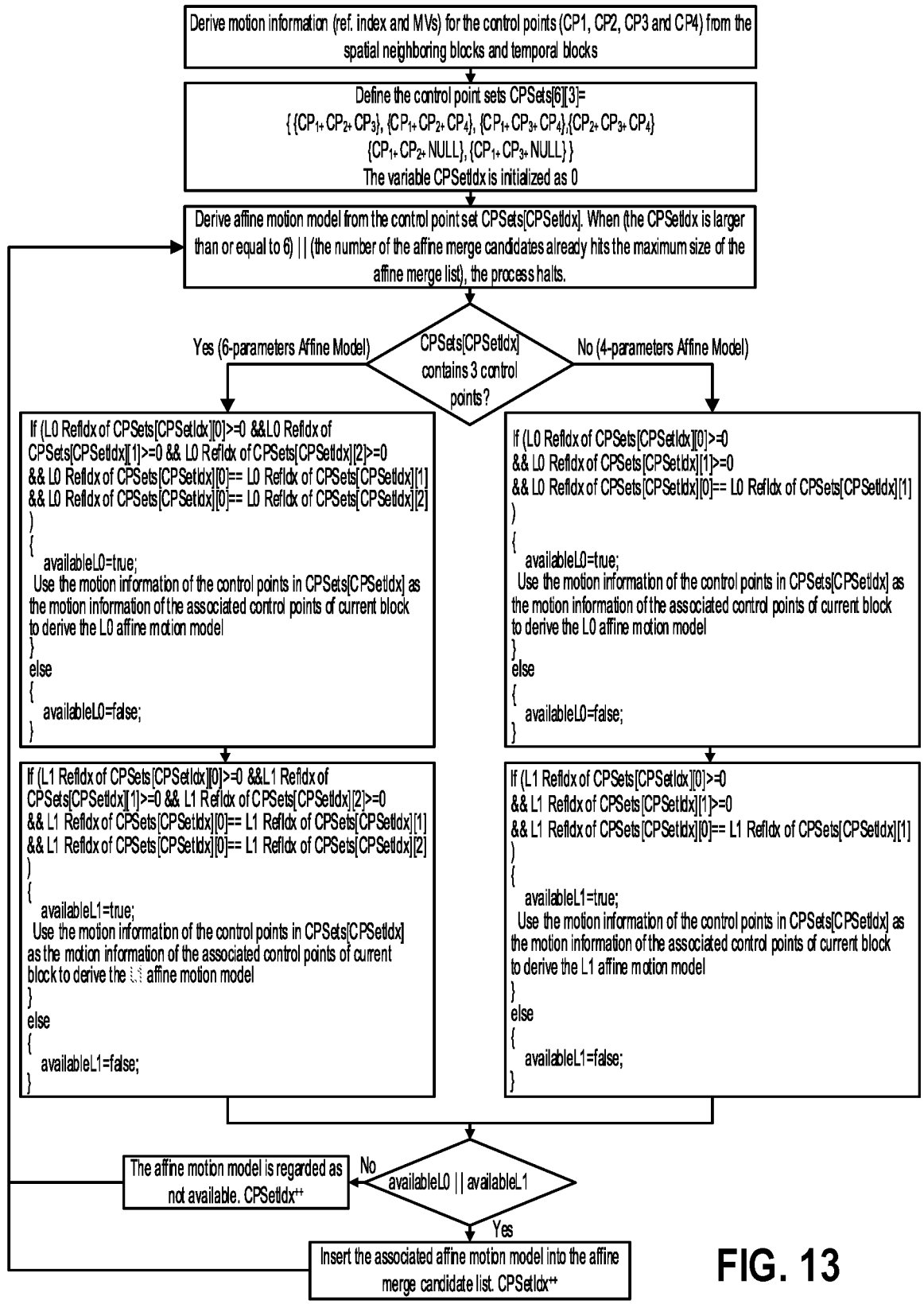
FIG. 13 is a method for deriving affine merge candidates, according to an example of the present disclosure.

FIG. 13 shows a flow chart of a method for deriving affine merge candidates. In another embodiment, when the reference indices between control points are different, the affine motion model derived by the associated control point set is regarded as non-available. In yet another proposed scheme, the checking of the motion information between control points is modified to consider the conditions when the reference indices between control points are different. In the proposed schemes, when the reference indices are different between control points, the motion information of one selected control point is used as the motion information for all the control points. Two examples are given in FIGS. 14 and 15 (described below) to demonstrate the proposed modifications on the derivation of the List 0 (or called forward reference pictures list) 6-parameters affine motion model. Without loss of generality, the same modifications could be applied to the list 1 or 4-parameters affine motion model derivation as well.

FIG. 14 shows a derivation of an affine motion model considering different reference indices between control points.

FIG. 15 shows a derivation of an affine motion model considering different reference indices between control points.

In yet another proposed scheme, the checking of the motion information between control points are all prohibited. In the proposed schemes, as long as the control point has motion information, they are used to construct the affine motion model even when they have different reference picture indices. An example flowchart based on the existing method is depicted in FIG. 16 (described below).

Other embodiments will be apparent to those skilled in the art from consideration of the specification and practice of the embodiment disclosed here. This application is intended to cover any variations, uses, or adaptations of the embodiment following the general principles thereof and including such departures from the present disclosure as come within the known or customary practice in the art. It is intended that the specification and examples be considered as exemplary only, with a true scope and spirit of the embodiment being indicated by the following claims.

It will be appreciated that the present embodiment is not limited to the exact examples described above and illustrated in the accompanying drawings and that various modifications and changes can be made without departing from the scope thereof. It is intended that the scope of the embodiment only be limited by the appended claims.

FIG. 16 shows a derivation of affine motion model considering reference picture indices.

FIG. 17 shows a computing environment 1710 coupled with a user interface 1760. Computing environment 1710 can be part of data processing server. Computing environment 1710 includes processor 1720, memory 1740, and I/O interface 1750.

The processor 1720 typically controls overall operations of the computing environment 1710, such as the operations associated with the display, data acquisition, data communications, and image processing. The processor 1720 may include one or more processors to execute instructions to perform all or some of the steps in the above-described methods. Moreover, the processor 1720 may include one or more modules that facilitate the interaction between the processor 1720 and other components. The processor may be a Central Processing Unit (CPU), a microprocessor, a single chip machine, a GPU, or the like.

The memory 1740 is configured to store various types of data to support the operation of the computing environment 1710. Examples of such data comprise instructions for any applications or methods operated on the computing environment 1710, MRI datasets, image data, etc. The memory 1740 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1750 provides an interface between the processor 1720 and peripheral interface modules, such as a keyboard, a click wheel, buttons, and the like. The buttons may include but are not limited to, a home button, a start scan button, and a stop scan button. The I/O interface 1750 can be coupled with an encoder and decoder.

In an embodiment, there is also provided a non-transitory computer-readable storage medium comprising a plurality of programs, such as comprised in the memory 1740, executable by the processor 1720 in the computing environment 1710, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, wherein the plurality of programs, when executed by the one or more processors, cause the computing device to perform the above-described method for motion prediction.

In an embodiment, the computing environment 1710 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

What is claimed is:

1. A video encoding method, comprising:
   acquiring, by an encoder, one or more control point sets, wherein each control point set is associated with a control point set index and comprises multiple control points;
   determining, by the encoder, regardless of motion vectors of control points in a control point set, whether a reference index of each control point for a control point set index within the control point set is greater than or equal to zero and whether a reference index of each control point for a control point set index within the control point set is equal to each other;
   setting, by the encoder, a flag indicating that an affine motion model is available based on the determination results without comparisons between the motion vectors of the control points in the control point set; and
   encoding, by the encoder, prediction related information into a bitstream;
   wherein setting the flag indicating that the affine motion model is available based on the determination result without comparisons between the motion vectors of the control points in the control point set comprises at least one of following acts:
   setting the flag indicating that the affine motion model is available on a condition that a reference index of each control point for a control point set index within the control point set is greater than or equal to zero and a reference index of each control point for the control point set index in a first reference list is equal to each other; or
   setting the flag indicating that the affine motion model is available on a condition that a reference index of each control point for a control point set index within the control point set is greater than or equal to zero and a reference index of each control point for the control point set index in a second reference list is equal to each other.

2. The method of claim 1, wherein acquiring the one or more control point sets comprises:
   acquiring spatial neighboring blocks and temporal blocks from a video inputted into the encoder;
   determining control points based on the spatial neighboring blocks and the temporal blocks;
   deriving motion information based on the control points from the spatial neighboring blocks and the temporal blocks; and
   defining a control point set based on the control points.

3. The method of claim 1, wherein the control point set comprises at least two control points; wherein each control point comprises a first reference index, a first motion vector, a second reference index, and a second motion vector.

4. The method of claim 1, wherein the control point set is associated with a first reference index in a first reference list or a second reference index in a second reference list.

5. The method of claim 1, further comprising:
   setting, by the encoder, motion information of the control points in the control point set to be same as motion information of associated control points of a current block to derive a constructed affine motion model; and
   determining, by the encoder, that the constructed affine motion model is available, and
   inserting, by the encoder, the constructed affine motion model into an affine merge candidate list.

6. The method of claim 2, wherein the control points (CP) comprise $CP_1$, $CP_2$, $CP_3$, and $CP_4$; and wherein defining the control point set comprises:
   defining the control point set as $\{\{CP_1, CP_2, CP_3\}, \{CP_1, CP_2, CP_4\}, \{CP_1, CP_3, CP_4\}, \{CP_2, CP_3, CP_4\}, \{CP_1, CP_2, \text{NULL}\}, \{CP_1, CP_3, \text{NULL}\}\}$.

7. The method of claim 1, further comprising:
   determining, by the encoder, that a motion vector of a first control point for the control point set index within the control point set associated with a motion vector in a first reference list does not equal to a motion vector of a second control point for the control point set index within the control point set associated with a motion vector in the first reference list, or a motion vector of the first control point does not equal to a motion vector of a third control point for the control point set index within the control point set associated with a motion vector in the first reference list; and
   setting, by the encoder, motion information of the control points in the control point set for the control point set index to be same as the motion information of associated control points of a current block to derive a constructed affine motion model.

8. The method of claim 7, further comprising:
   determining, by the encoder, that a reference index of the first control point for the control point set index within the control point set associated with a reference index in the first reference list is greater than or equal to zero; and
   setting, by the encoder, motion information of the first control point for the control point set index within the control point set associated with a reference index in the first reference list same as the motion information of all the control points of the current block to derive the constructed affine motion model.

9. The method of claim 1, further comprising:
   setting, by the encoder, motion information of the control points in control point set index to be same as motion information of associated control points of a current block to derive a constructed affine motion model;
   determining, by the encoder, that the constructed affine motion model is available,
   inserting, by the encoder, the constructed affine motion model into an affine merge candidate list; and setting, by the encoder, a reference index of a constructed affine motion model in the affine merge candidate list to be same as reference index of the current block.

10. A video encoding device comprising:
one or more processors;
a non-transitory computer-readable memory storing instructions executable by the one or more processors, wherein the one or more processors are configured to:
acquire one or more control point sets, wherein each control point set is associated with a control point set index and comprises multiple control points;
determine, regardless of motion vectors of control points in a control point set, whether a reference index of each control point for the control point set index within the control point set is greater than or equal to zero and whether a reference index of each control point for a control point set index within the control point set is equal to each other;
set a flag indicating that an affine motion model is available based on the determination results without comparisons between the motion vectors of the control points in the control point set; and
encode prediction related information into a bitstream;
wherein the one or more processors are configured to:
set the flag indicating that the affine motion model is available on a condition that a reference index of each control point for a control point set index within the control point set is greater than or equal to zero and a reference index of each control point for the control point set index in a first reference list is equal to each other; or
set the flag indicating that the affine motion model is available on a condition that a reference index of each control point for a control point set index within the control point set is greater than or equal to zero and a reference index of each control point for the control point set index in a second reference list is equal to each other.

11. The device of claim 10, wherein the one or more processors are configured to:
acquire spatial neighboring blocks and temporal blocks from a video inputted into the video encoding device;
determine control points based on the spatial neighboring blocks and the temporal blocks;
derive motion information based on the control points from the spatial neighboring blocks and the temporal blocks; and
define a control point set based on the control points.

12. The device of claim 10, wherein the one or more processors are further configured to:
set motion information of the control points in the control point set to be same as motion information of associated control points of a current block to derive a constructed affine motion model; and
determine that the constructed affine motion model is available, and insert the constructed affine motion model into an affine merge candidate list.

13. The device of claim 11, wherein the control points (CP) comprise $CP_1$, $CP_2$, $CP_3$, and $CP_4$; and wherein defining the control point set comprises:
defining the control point set as $\{\{CP_1, CP_2, CP_3\}, \{CP_1, CP_2, CP_4\}, \{CP_1, CP_3, CP_4\}, \{CP_2, CP_3, CP_4\}, \{CP_1, CP_2, NULL\}, \{CP_1, CP_3, NULL\}\}$.

14. The device of claim 10, wherein the one or more processors are further configured to:
determine that a motion vector of a first control point for the control point set index within the control point set associated with a motion vector in a first reference list does not equal to a motion vector of a second control point for the control point set index within the control point set associated with a motion vector in the first reference list, or a motion vector of the first control point does not equal to a motion vector of a third control point for the control point set index within the control point set associated with a motion vector in the first reference list; and
set motion information of the control points in the control point set for the control point set index to be same as the motion information of associated control points of a current block to derive a constructed affine motion model.

15. The device of claim 14, wherein the one or more processors are further configured to:
determine that a reference index of the first control point for the control point set index within the control point set associated with a reference index in the first reference list is greater than or equal to zero; and
set motion information of the first control point for the control point set index within the control point set associated with a reference index in the first reference list same as the motion information of all the control points of the current block to derive the constructed affine motion model.

16. The device of claim 10, wherein the one or more processors are further configured to:
set motion information of the control points in control point set index to be same as motion information of associated control points of a current block to derive a constructed affine motion model;
determine that the constructed affine motion model is available,
insert the constructed affine motion model into an affine merge candidate list; and
set a reference index of a constructed affine motion model in the affine merge candidate list same as reference index of the current block.

17. A non-transitory computer-readable storage medium storing a program, when the program is performed, causing a computing device to perform operations to generate a video bitstream and to store the video bitstream in the non-transitory computer-readable storage medium, wherein the operations comprising:
acquiring one or more control point sets, wherein each control point set is associated with a control point set index and comprises multiple control points;
determining, regardless of motion vectors of control points in a control point set, whether a reference index of each control point for the control point set index within the control point set is greater than or equal to zero and whether a reference index of each control point for a control point set index within the control point set is equal to each other;
setting a flag indicating that an affine motion model is available based on the determination results without comparisons between the motion vectors of the control points in the control point set; and
encoding prediction related information into a bitstream;
wherein setting the flag indicating that the affine motion model is available based on the determination results without comparisons between the motion vectors of the control points in the control point set comprises at least one of following acts:
setting the flag indicating that the affine motion model is available on a condition that a reference index of each control point for a control point set index within the control point set is greater than or equal to zero and a reference index of each control point for the control point set index in a first reference list is equal to each other; or setting the flag indicating that the affine motion model is available on a condition that a reference index of each control point for a control point set index within the control point set is greater than or equal to zero and a reference index of each control point for the control point set index in a second reference list is equal to each other.

* * * * *